US012804474B2

(12) United States Patent
Raghuvanshi et al.

(10) Patent No.: US 12,804,474 B2
(45) Date of Patent: Nov. 17, 2026

(54) SYSTEMS AND METHODS FOR ADJUSTING SUBSCRIBER POLICY

(71) Applicant: Boost SubscriberCo L.L.C., Englewood, CO (US)

(72) Inventors: Prashant Raghuvanshi, Parker, CO (US); Kevin Yao, Cheyenne, WY (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 195 days.

(21) Appl. No.: 17/354,826

(22) Filed: Jun. 22, 2021

(65) Prior Publication Data

US 2022/0408315 A1 Dec. 22, 2022

(51) Int. Cl.

*H04W 28/24* (2009.01)
*H04W 8/18* (2009.01)
*H04W 28/02* (2009.01)

(52) U.S. Cl.

CPC .......... *H04W 28/24* (2013.01); *H04W 8/186* (2013.01); *H04W 28/0268* (2013.01)

(58) Field of Classification Search

CPC . H04W 28/24; H04W 8/186; H04W 28/0268; H04L 65/80; H04L 67/61; H04L 2012/5638; H04L 41/5003; H04L 41/5067; H04L 45/302; H04L 47/2491; H04L 47/80; H04L 47/805; H04L 45/125; H04L 41/5006; H04L 41/5019; H04L 47/2425

See application file for complete search history.

(56) References Cited

U.S. PATENT DOCUMENTS 7,478,158 B1 * 1/2009 Rodgers .................. H04L 47/20 370/395.42
8,634,293 B2 * 1/2014 Kanodia ................. H04L 47/20 370/310
8,706,863 B2 * 4/2014 Fadell ................... H04M 15/00 455/406
8,897,798 B2 * 11/2014 Agrawal ............. H04W 72/542 455/452.2
9,203,629 B2 * 12/2015 Momtahan ............ H04M 15/66
9,215,180 B1 * 12/2015 Bertz ...................... H04L 47/25
9,215,588 B2 * 12/2015 Andreasen ............ H04L 63/164
10,200,509 B1 * 2/2019 Maharia ................ H04W 28/02
10,243,791 B2 * 3/2019 Dosovitsky .......... H04L 41/0816
10,645,230 B1 * 5/2020 Tandon ................. H04W 76/12
(Continued)

FOREIGN PATENT DOCUMENTS

AU 2004262820 B2 * 7/2008 ............. H04L 67/14
EP 3697043 A1 * 8/2020 ......... H04L 43/0817
(Continued)

*Primary Examiner* — Mehmood B. Khan
(74) *Attorney, Agent, or Firm* — Seed Intellectual Property Law Group LLP

(57) ABSTRACT

A policy adjustment system changes a quality of service attribute for a user device without affecting the policy applied to the user device. The policy adjustment system applies a policy to a plurality of user devices, the policy defining one or more quality of service attributes. The policy adjustment system receives an indication that a quality of service attribute should be changed for a user device. The policy adjustment system changes the quality of service attribute for the user device without affecting the quality of service attributes for the other user devices for which the policy is applied.

16 Claims, 9 Drawing Sheets

(56) References Cited

U.S. PATENT DOCUMENTS 10,749,977 B1 * 8/2020 Marra .................. H04L 67/306
11,297,525 B2 * 4/2022 Cakulev ................ H04W 28/24
11,412,052 B2 * 8/2022 Guim Bernat ........ H04W 40/20
11,611,899 B2 * 3/2023 Liang .................... H04W 28/02
12,156,296 B2 * 11/2024 Costa .................... H04W 76/16
2002/0160811 A1 * 10/2002 Jannette .................. H04L 47/20 455/560
2004/0006602 A1 * 1/2004 Bess ....................... H04L 67/02 709/230
2006/0040674 A1 * 2/2006 Vannithamby ........ H04L 1/0016 455/452.2
2006/0251116 A1 * 11/2006 Bedingfield, Sr. ........................... H04L 41/0896 370/468
2006/0294238 A1 * 12/2006 Naik ..................... G06F 9/5072 709/226
2007/0189185 A1 * 8/2007 Chen ................... H04L 12/2809 370/465
2007/0201502 A1 * 8/2007 Abramson .............. H04L 67/56 370/429
2008/0310303 A1 * 12/2008 Wang .................... H04W 28/24 370/230.1
2009/0103466 A1 * 4/2009 Gu ........................ H04L 12/189 370/312
2009/0204645 A1 * 8/2009 Machida ............. G06F 11/3419
2010/0192212 A1 * 7/2010 Raleigh ................. G06F 15/177 726/7
2010/0248643 A1 * 9/2010 Aaron ................... H04L 1/0022 709/233
2011/0044262 A1 * 2/2011 Satapathy ......... H04W 28/0268 370/329
2011/0222405 A1 * 9/2011 Bugenhagen ........... H04L 47/22 370/235
2011/0314145 A1 * 12/2011 Raleigh ................... H04L 12/14 709/224
2012/0008501 A1 * 1/2012 Lundh ..................... H04L 47/70 370/235
2012/0011517 A1 * 1/2012 Smith ................. G06F 11/3072 715/224
2012/0140632 A1 * 6/2012 Norp ................... H04L 67/1001 370/235
2012/0155296 A1 * 6/2012 Kashanian .......... H04L 12/1417 370/252
2012/0222037 A1 * 8/2012 Labat .................... G06F 9/5072 718/104
2012/0300712 A1 * 11/2012 Hakola ............... H04W 74/002 370/329
2013/0051276 A1 * 2/2013 Pantelias ............... H04L 47/762 375/E7.011
2013/0054428 A1 * 2/2013 Shaikh .................. G06Q 30/04 705/30
2013/0122910 A1 * 5/2013 Singh ...................... H04L 43/08 455/437
2013/0176908 A1 * 7/2013 Baniel ................. H04L 41/5022 370/259
2013/0310058 A1 * 11/2013 Ibrahim .............. H04W 72/541 455/450
2014/0126358 A1 * 5/2014 Bedekar ................ H04L 47/127 370/230
2014/0187243 A1 * 7/2014 Rune ................ H04W 36/0083 455/436
2015/0040121 A1 * 2/2015 Barabash ............ G06F 9/45558 718/1
2015/0195858 A1 * 7/2015 Jin ...................... H04L 41/5051 370/230
2015/0249750 A1 * 9/2015 Kakadia ............. H04M 15/8011 455/406
2016/0261516 A1 * 9/2016 Gopinathan ........ H04L 41/0896
2017/0289047 A1 * 10/2017 Szilágyi .............. H04L 41/0853
2019/0173752 A1 * 6/2019 Dosovitsky ......... H04L 41/0816
2019/0173760 A1 * 6/2019 Gal ....................... H04L 41/046
2020/0045266 A1 * 2/2020 Archer, III ............. H04N 7/162
2020/0275305 A1 * 8/2020 Huang-Fu ......... H04W 28/0268
2021/0117233 A1 * 4/2021 Chaganti ................. G06F 9/505
2021/0158151 A1 * 5/2021 Wang ........................ G06N 3/02
2021/0182658 A1 * 6/2021 Wang ..................... G06N 3/045
2021/0218679 A1 * 7/2021 Chong ................ H04L 41/0894
2021/0400146 A1 * 12/2021 Muñoz De La Torre Alonso ....... H04L 47/805
2022/0159504 A1 * 5/2022 Wei ................... H04W 28/0268
2022/0353731 A1 * 11/2022 Zhu ................... H04W 28/0268
2022/0361038 A1 * 11/2022 Kim .................. H04W 28/0942
2022/0377598 A1 * 11/2022 Pan ................... H04W 28/0268
2022/0400295 A1 * 12/2022 Bogatin ............. H04N 21/6143
2023/0036993 A1 * 2/2023 Velev .................... H04W 48/06
2023/0046839 A1 * 2/2023 Raleigh ................. H04M 15/61
2023/0056482 A1 * 2/2023 Nádas ............... H04W 28/0247
2023/0070882 A1 * 3/2023 Youn ................... H04L 65/1016

FOREIGN PATENT DOCUMENTS

GB 2522046 A * 7/2015 ........... H04B 7/0413
WO WO-03062983 A2 * 7/2003 ......... H04L 67/1097
WO WO-2007082918 A1 * 7/2007 ............ H04W 28/24
WO WO-2008011082 A2 * 1/2008 ............. H04L 45/00
WO WO-2015067095 A1 * 5/2015 ............ H04W 28/24
WO WO-2015081022 A1 * 6/2015 ............. A63F 13/77
WO WO-2016091298 A1 * 6/2016 ............. H04L 47/12
WO WO-2018224122 A1 * 12/2018 ........ H04W 28/0215
WO WO-2021088625 A1 * 5/2021 ........ H04W 28/0268
WO WO-2022048746 A1 * 3/2022 ............ H04W 28/12
WO WO-2022208134 A1 * 10/2022 ........... H04L 47/805

* cited by examiner

300 user policy data table

| Device ID | Policy Type | Default Policy? | QOS details | Threshold limit | |
|---|---|---|---|---|---|
| DeviceA | Bronze | Yes | Data rate: 20kbps<br>Data usage: 10GB<br>Message limit: 1000 | Data rate: >15kbps for 10 days<br>Data usage: 8GB<br>Message limit: 900 | 301 |
| DeviceB | Bronze | No | Data rate: 50kbps<br>Data usage: 10GB<br>Message limit: 1000 | Data rate: >45kbps for 10 days<br>Data usage: 8GB<br>Message limit: 900 | 302 |
| DeviceC | Gold | Yes | Data rate: 10mbps<br>Data usage: 50GB<br>Message limit: unlimited | Data rate: >8mbps for 10 days<br>Data usage: 40GB | 303 |
| ⋮ | ⋮ | ⋮ | ⋮ | ⋮ | |
| 310 | 311 | 312 | 313 | 314 | |

Fig. 3

SYSTEMS AND METHODS FOR ADJUSTING SUBSCRIBER POLICY

BRIEF SUMMARY

Subscriber policies are used to ensure that users assigned to those policies receive a similar user experience and quality of service. Typically, service providers define multiple policies, where each policy guarantees a certain level of the quality of service. Thus, multiple users ("subscribers") are assigned to each subscriber policy. However, because multiple subscribers belong to each policy, any changes made to the policy affect every subscriber, preventing subscribers, and service providers, from being able to customize policies. Furthermore, users are unable to temporarily increase their quality of service, because it is tied to a policy used by other subscribers. Additionally, technical specialists must manually make any changes to a policy, which requires significant time and effort. In some instances, a technical specialist must request a change in a policy, which must be approved before any changes can be made, thus requiring additional effort to validate and approve the change.

The embodiments disclosed herein address the issues above and thus help solve the above technical problems and improve the technology of subscriber policies by providing a technical solution that changes values for quality of service ("QoS") attributes associated with a policy for an individual subscriber without affecting other subscribers assigned to the policy. Additionally, the embodiments disclosed herein are further able to track a subscriber's policy usage to determine whether the subscriber has reached a threshold defined by the policy. Furthermore, the embodiments disclosed herein alert the subscriber when they have reached a QoS threshold defined by the policy and give the subscriber the option to change the values for QoS attributes associated with the policy in response to the alert.

In some embodiments, a policy adjustment system applies a policy to a user device, receives an indication that a quality of service attribute of the policy should be changed, and changes the quality of service attribute for that user device. In some embodiments, the policy adjustment system causes a policy to be applied to a user device, causes a user device to receive an indication that a value of a quality of service attribute has exceeded a threshold, display the indication that the value has exceeded a threshold, determine whether a quality of service attribute should be changed, and transmit an indication that the quality of service attribute should be changed based on a determination that it should be changed. In some embodiments, the policy adjustment system includes a policy adjustment data structure, which can be used to apply a policy to a user device and change at least one quality of service attribute of the policy for the user device.

BRIEF DESCRIPTION OF THE SEVERAL VIEWS OF THE DRAWINGS

FIG. 3 is a table diagram representing a user policy data table, according to various embodiments described herein.

DETAILED DESCRIPTION

Figure 1A:
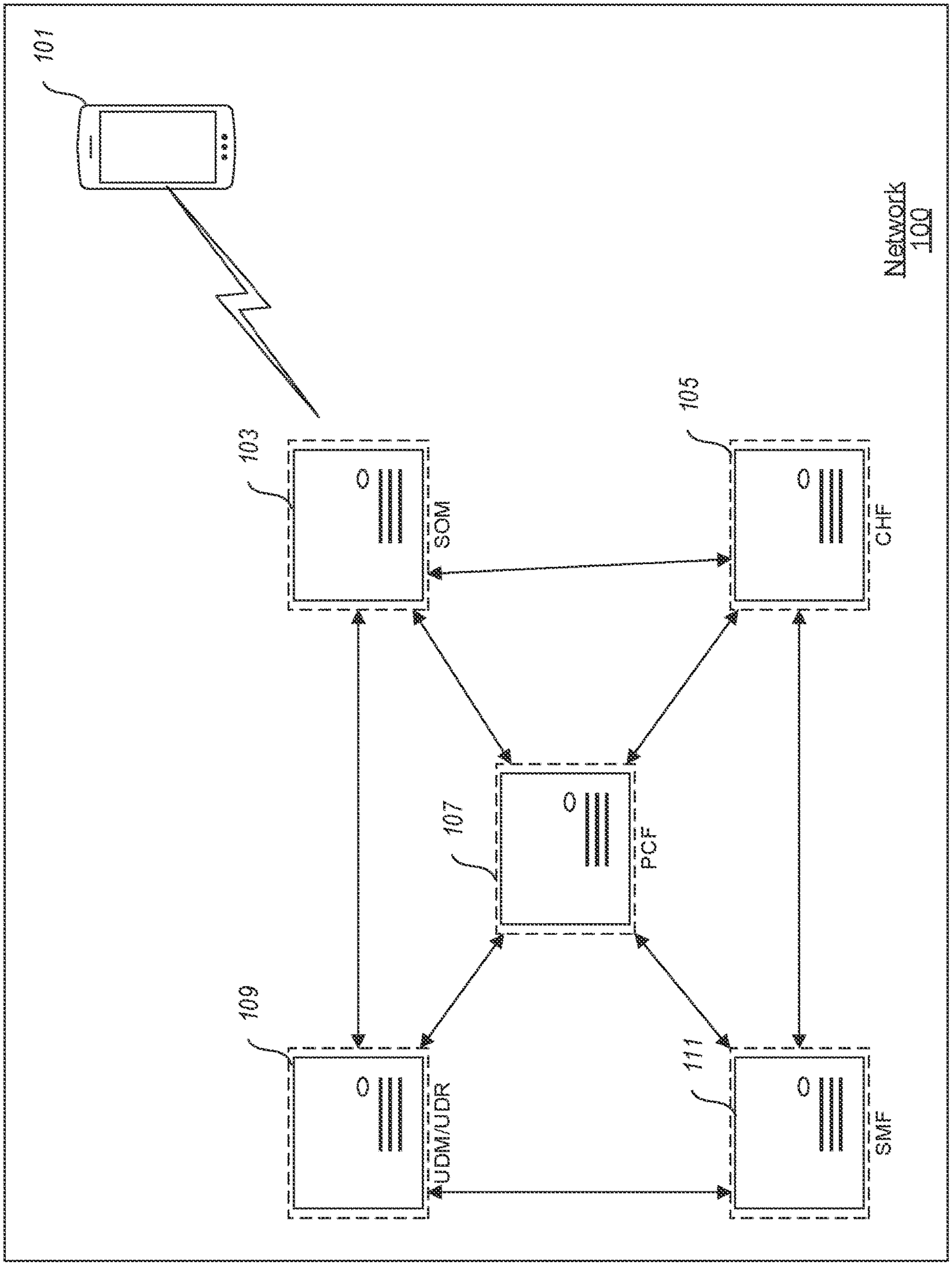
FIG. 1*a* is a display diagram showing an example network in which the policy adjustment system operates, according to various embodiments described herein.

Service providers typically provide numerous policies where each policy guarantees a certain quality of service, such as data rate limits, data usage limits, messaging and call limits, and other metrics used to measure the quality of service provided to a user device. These policies are typically applied to numerous user devices so that each of the user devices are guaranteed a quality of service based on the policy applied. It is currently difficult for subscribers to change a quality of service attribute for a policy their user device is subscribed to. Furthermore, subscribers cannot change a quality of service attribute for their user device if they are near a threshold or limit imposed by their policy without completely switching to a new policy or changing the policy for every other user assigned to the policy.

Changing an entire policy assigned to many users typically requires a maintenance period. Furthermore, changing a policy is currently done manually, and may cause network outages for the service provider. Additionally, in order to create a new policy, a technical specialist must manually create the policy, which also may cause outages. Creating a new policy may also require a certain level of interest for the service provider to spend resources to create the policy.

The embodiments disclosed herein address the issues above and help solve the above technical problems and improve the technology of subscriber policies by providing a technical solution that changes a policy for an individual subscriber without affecting other subscribers assigned to the policy. A policy adjustment system additionally tracks whether a subscriber has exceeded a threshold for a quality of service attribute for the policy. The policy adjustment system can alert the subscriber that they have exceeded that threshold, and receive user input indicating whether the subscriber would like to change the quality of service attribute. The policy adjustment system also allows a user to change at least one quality of service attribute of a policy before applying the policy to the user device. Thus, the embodiments disclosed herein provide dynamic values QoS attributes, such as, for example, 3GPP defined QoS attributes, for each individual subscriber instead of values tied to a plan, rate plan, or policy.

In some embodiments, the policy adjustment system obtains a current usage value of a quality of service attribute for a user device. The policy adjustment system determines whether the current usage value of the quality of service attribute has exceeded a predetermined threshold. The predetermined threshold may be a limit defined by the policy, such as a data usage limit, messaging limit, data rate limit, or other limits applied to measures of quality of service for a service provider. The predetermined threshold may be lower than the limit defined by the policy, such that a user is able to be warned before the limit is reached. For example, a user device may be subscribed to a policy with a data usage cap of 5 GB, and the threshold may be 4 GB. In this example, the policy adjustment system determines that the current usage value of the data usage cap exceeds the threshold value when the current usage value meets or exceeds the 4 GB data usage threshold. In some embodiments, the threshold may be the same as the quality of service limit. With regards to the example above the data usage cap would be the threshold value.

In some embodiments, the policy adjustment system transmits an indication that the current usage value has exceeded the predetermined threshold to the user devices. The policy adjustment system may receive, from the user device, an indication to change at least one quality of service attribute. The indication to change at least one quality of service attribute may be received after transmitting the indication that the current usage value has exceeded the predetermined threshold.

In embodiments where the threshold is less than the quality of service limit for the policy, the policy adjustment system may determine whether the user device has reached the quality of service limit after exceeding the threshold. The policy adjustment system may then transmit an indication that the user device has exceeded the quality of service threshold for at least one quality of service attribute, as well as the quality of service limit for the at least one quality of service attribute. The policy adjustment system may receive an indication to change the at least one quality of service attribute after transmitting the indication that the user device exceeded the quality of service threshold and the quality of service limit.

In some embodiments, the policy adjustment system obtains current usage values for at least one quality of service attribute for a plurality of user devices. The policy adjustment system may apply a machine learning model to the obtained current usage values to generate a new threshold for at least one quality of service attribute. The machine learning model may be trained to receive current usage values for a quality of service attribute as an input and output a threshold value for at least one quality of service attribute. The policy adjustment system may update the threshold value for the at least one quality of service attribute based on the output threshold value.

In some embodiments, the policy adjustment system accesses an index of one or more threshold values for at least one quality of service attribute. The index of threshold values may be populated with threshold values provided by other service providers for similar policies. The index of threshold values may be populated by one or more techniques, such as: crawling materials published by other service providers, receiving feedback from users of the other service providers, receiving user input defining the threshold values of other service providers, etc. The policy adjustment system may use the index of threshold values to determine a new threshold value for at least one quality of service attribute. The policy adjustment system may update the threshold value for the at least one quality of service attribute based on the new threshold value.

In some embodiments, the policy adjustment system receives input from a user equipment device indicating at least one threshold for at least one quality of service attribute. The user equipment device may obtain the indication of at least one threshold via user input.

In some embodiments, the policy adjustment system uses a charging function to determine whether at least one quality of service attribute has exceeded the predetermined threshold. In some embodiments, the policy adjustment system uses a system on module (SOM) to change the at least one quality of service attribute for the user device. The policy adjustment system may use the SOM to communicate with the user device. In some embodiments, the policy adjustment system uses an application function to change the at least one quality of service attribute for the user device. The policy adjustment system may use the application function to communicate with the user device.

In some embodiments, the policy adjustment system causes a policy to be applied to a user device. The policy adjustment system may cause the user device to display the indication that a value of at least one quality of service attribute has reached a predetermined threshold to a user. The user device may determine whether at least one quality of service attribute should be changed based on user input. The user device may transmit an indication that at least one quality of service attribute should be changed to the policy adjustment system.

In some embodiments, the user device transmits the indication that the quality of service attribute should be changed to a SOM. The indication that a current usage value of at least one quality of service attribute may be transmitted to the user device from a SOM.

In some embodiments, the user device transmits the indication that the quality of service attribute should be changed to an application function. The indication that a current usage value of at least one quality of service attribute may be transmitted to the user device from an application function.

In some embodiments, the policy adjustment system includes a policy adjustment data structure used to apply a policy to a user device and change at least one quality of service attribute of the policy for the user device. The policy adjustment data structure may include information specifying one or more policies and information specifying one or more quality of service attributes for each of the policies. The policy adjustment data structure may further include information specifying one or more user devices. The information specifying policies can be used to assign a policy to each of the user devices. The policy adjustment data structure can further be used to change a quality of service attribute of a policy for a user device.

In some embodiments, the policy adjustment data structure additionally includes information specifying one or more thresholds for each quality of service attribute of each policy. The policy adjustment data structure may additionally include information specifying one or more current values of each quality of service attribute for each user device. The policy adjustment data structure can thus be used to determine whether a current value of a quality of service attribute exceeds a threshold for the quality of service attribute for a specific user device.

In some embodiments, the policy adjustment data structure includes a machine learning model trained to receive current usage values and output a threshold value for a policy. The output threshold value may be used to update a threshold value for a quality of service attribute.

In some embodiments, the policy adjustment data structure includes an index of alternative thresholds for at least one quality of service attribute. The index may be used to determine a new threshold for at least one quality of service attribute. The policy adjustment system may use statistical analysis on the alternative thresholds in the index, such as: by using an average, such as a mean, median, mode, etc.; by using a standard deviation; by using regression analysis; and other statistical analysis techniques.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1*a* is a display diagram showing an example network 100 in which the policy adjustment system operates, according to various embodiments described herein. It is to be appreciated that FIG. 1*a* illustrates just one example of a network in which the policy adjustment system operates, and that various embodiments discussed herein are not limited to the use of such an environment. The network 100 includes user equipment 101, a SOM 103, a charging function (CHF) 105, a policy control function (PCF) 107, a unified data repository/unified data manager (UDM/UDR) 109, and a session management function (SMF) 111.

The network 100 is a network, communication system, or networked system (not shown), to which the user equipment 101, SOM 103, CHF 105, PCF 107, UDM/UDR 109, SMF 111, and user equipment devices (not shown), may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the user equipment 101, SOM 103, CHF 105, PCF 107, UDM/UDR 109, SMF 111, and user equipment devices, used as part of the policy adjustment system, to communicate with each other.

The user equipment 101 may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc., —routers, digital assistants, personal assistant devices—such as Amazon Alexa, Google Home, etc., —drones, etc. The user equipment 101 may interconnect to one or more communications media or sources, such as routers, network switches, modems, etc., to transmit communications to other devices. The user equipment 101 may have a policy managed by one or more of the SOM 103, CHF 105, PCF 107, UDM/UDR 109, and SMF 111.

The SOM communicates with the CHF 105, PCF 107, and UDM/UDR 109, to provide an interface between these functions and the user equipment 101. The SOM may communicate with the CHF 105, PCF 107, and UDM/UDR 109 by using a web API, such as SOAP, or by using other communication protocols and methods accessible by the CHF 105, PCF 107, and UDM/UDR 109. In some embodiments, the network 100 further comprises a network exposure function between the SOM 103 and the CHF 105, PCF 107, and UDM/UDR 109.

The CHF 105 is a charging function which manages and monitors current usage values for quality of service attributes defined by the policy. The CHF may also communicate with the UDM/UDR 109 through the PCF 107.

The PCF 107 is a policy control function which manages policies assigned to user equipment 101. The PCF communicates with the SOM 103, CHF 105, UDM/UDR 109, and SMF 111.

The UDM/UDR 109 is a unified data repository or a unified data manager, which is used to store and manage data related to the policies, such as the quality of service thresholds for quality of service attributes, usage values of the quality of service attributes, quality of service attributes provided by policies, etc. The UDM/UDR communicates with the SOM 103, the PCF 107, and the SMF 111.

The SMF 111 is a session management function, which manages sessions for a user equipment device 101. The SMF communicates with the CHF 105, the PCF 107, and the UDM/UDR 109.

Figure 1B:
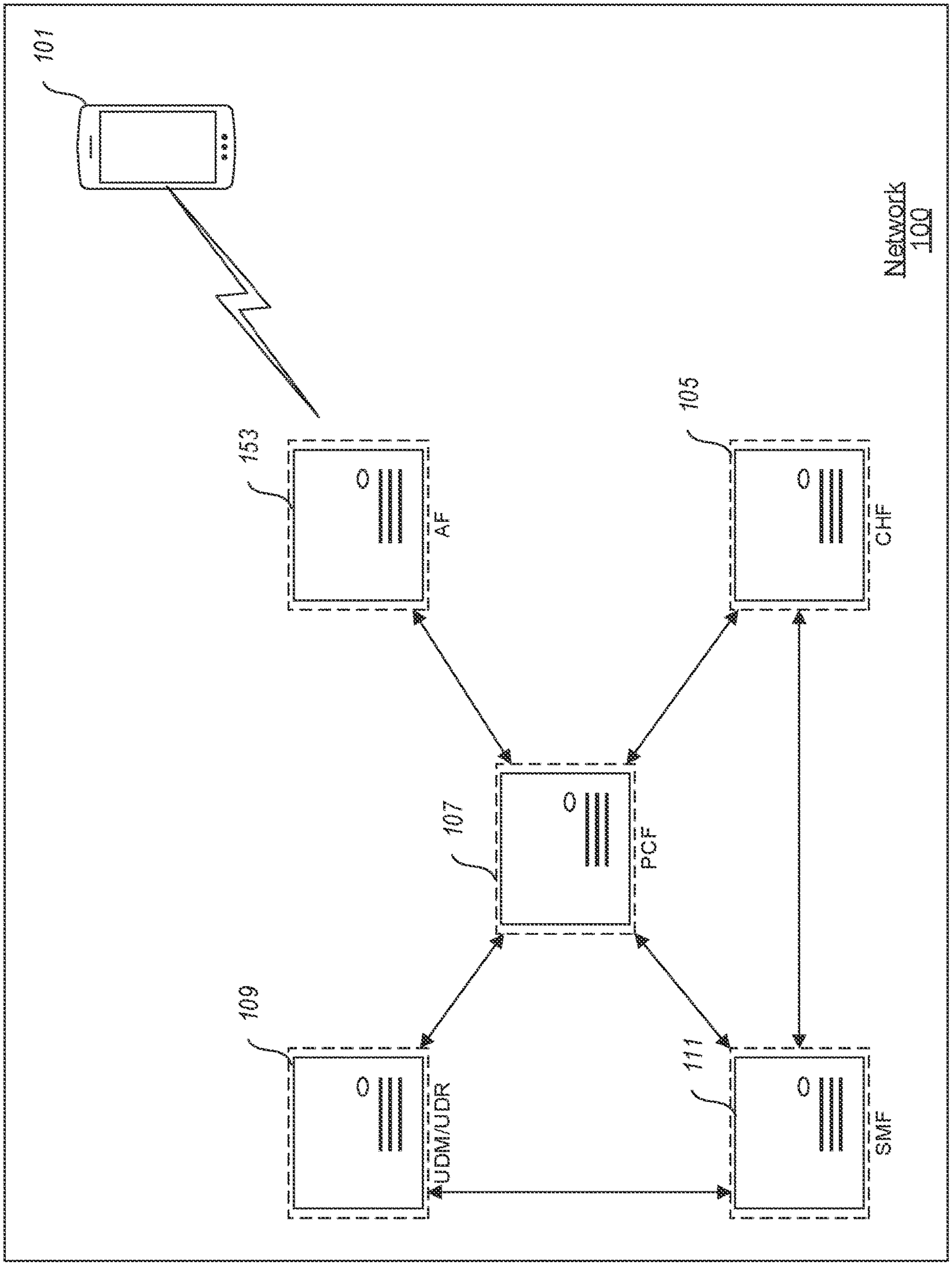
FIG. 1*b* is a display diagram showing an example network in which the policy adjustment system operates, according to various embodiments described herein.

FIG. 1*b* is a display diagram showing an example network 100 in which the policy adjustment system operates, according to various embodiments described herein. It is to be appreciated that FIG. 1*b* illustrates just one example of a network in which the policy adjustment system operates, and that various embodiments discussed herein are not limited to the use of such an environment. The network 100 includes user equipment 101, an application function (AF) 153, a charging function (CHF) 105, a policy control function (PCF) 107, a unified data repository/unified data manager (UDM/UDR) 109, and a session management function (SMF) 111.

In FIG. 1*b*, the SOM 103 is replaced with an application function 153. The AF 153 performs similar functionality to the SOM 103. In some embodiments, the network 100 further comprises a network exposure function between the AF 153 and the CHF 105, PCF 107, and UDM/UDR 109.

The above description of the network 100, and the various devices and functions therein, is intended as a broad, non-limiting overview of an example environment in which various embodiments of a policy adjustment system can operate. The network 100, and the various devices therein, may contain other devices, systems and/or media not specifically described herein. The network 100, and the various functions therein, may contain other functions, systems and/or media not specifically described herein.

Example embodiments described herein provide applications, tools, data structures and other support to implement systems and methods for managing the state of a network. The example embodiments described herein additionally provide applications, tools, data structures and other support to implement systems and methods for providing determining whether a change has occurred on a computer network, as well as what caused the change to occur. Other embodiments of the described techniques may be used for other purposes, including for training a machine learning model to generate an action to take when a change in the network state is detected. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
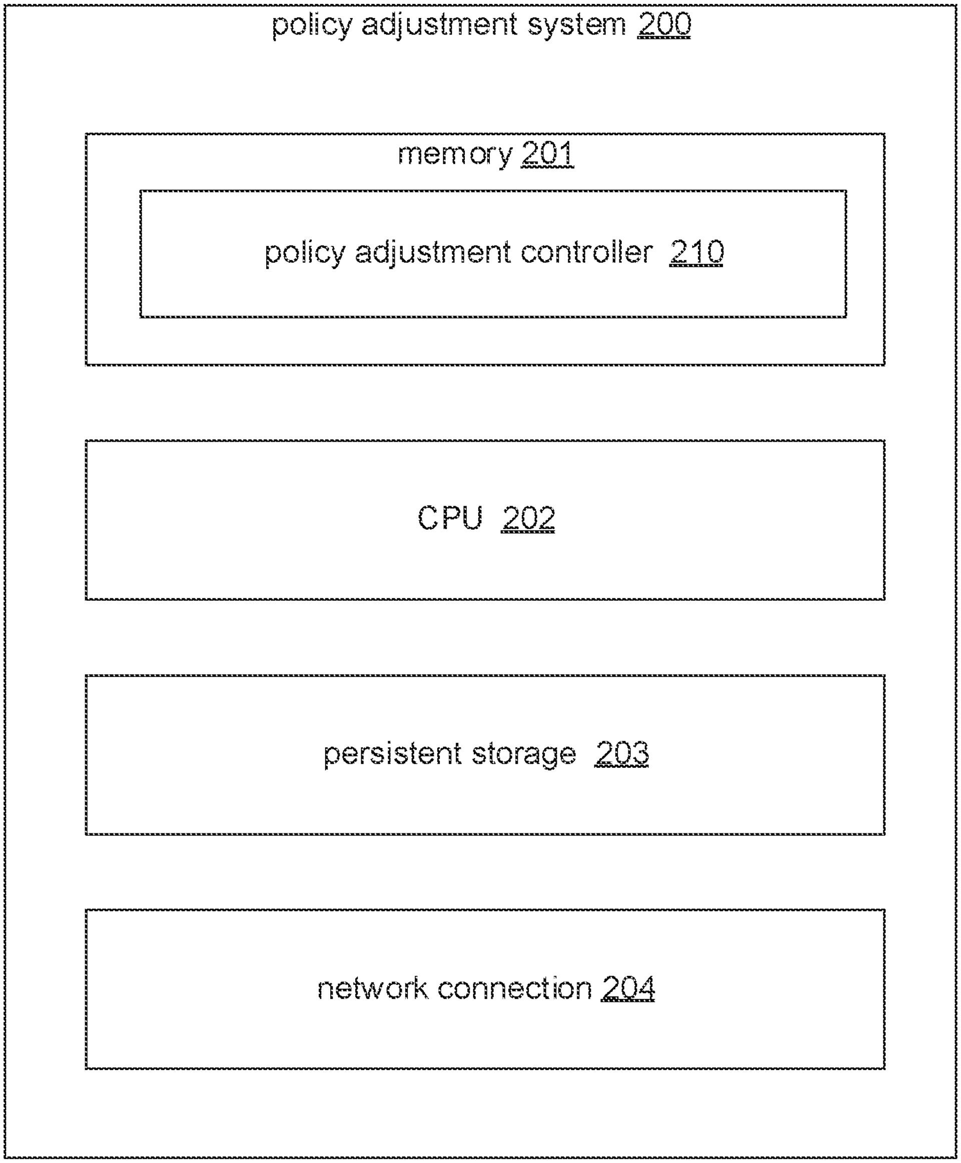
FIG. 2 is a block diagram depicting example components incorporated in a policy adjustment system, according to various embodiments described herein.

FIG. 2 is a block diagram depicting example components incorporated in a policy adjustment system 200, according to various embodiments described herein. The policy adjustment system 200 may be incorporated as part of the SOM 103 or AF 153. The policy adjustment system may exist outside of the SOM 103 or AF 153 as a separate function or device. In various embodiments, the policy adjustment system 200 includes one or more of the following: a computer memory 201 for storing programs and data while they are being used, including data associated with the policies, user equipment 101, and the policy adjustment system 200, an operating system including a kernel, and device drivers; a central processing unit (CPU) 202 for executing computer programs; a persistent storage device 203, such as a hard drive or flash drive for persistently storing programs and data; and a network connection 204 for connecting to one or more functions, such as CHF 105, PCF 107, UDR/UDM 109, and/or other functions, and for connecting to one or more computer devices such as the user equipment 101 and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from functions, such as CHF 105, PCF 107, UDR/UDM 109, and/or other functions, and from computer devices such as the user equipment 101 and/or other computer systems. In various embodiments, the policy adjustment system 200 additionally includes input and output devices, such as a keyboard, a mouse, display devices, etc.

While a policy adjustment system 200 configured as described may be used in some embodiments, in various other embodiments, the policy adjustment system 200 may be implemented using devices of various types and configurations, and having various components. The memory 201 may include a policy adjustment controller 210 which contains computer-executable instructions that, when executed by the CPU 202, cause the policy adjustment system 200 to perform the operations and functions described herein. For example, the programs referenced above, which may be stored in computer memory 201, may include or be comprised of such computer-executable instructions. The memory 201 may also include a machine learning model trained to output a new threshold for a quality of service attribute based on one or more of: current usage values of quality of service attributes, previous usage values of quality of service attributes, etc. The memory 201 may also include an index of quality of service attribute thresholds.

The policy adjustment controller 210 performs the core functions of the policy adjustment system 200, as discussed herein and also with respect to FIGS. 3 through 8. In particular, the policy adjustment controller 210 changes quality of service attributes for a policy assigned to a user device without affecting other user devices assigned the same policy. Additionally, the policy adjustment controller 210 may receive an indication that a quality of service attribute should be changed for the user equipment when applying the policy to the user equipment. The policy adjustment controller 210 may also determine whether a user equipment device has reached or exceeded a threshold value for a quality of service attribute, and may transmit an indication that the user equipment device has reached or exceeded the threshold value. The policy adjustment controller 210 may receive an indication from the user equipment that a quality of service attribute should be changed for the user equipment. In some embodiments, the policy adjustment controller 210 updates the threshold value for a quality of service attribute by applying one or more of: current usage values for the quality of service attribute, prior usage values for the quality of service attribute, prior thresholds for the quality of service attribute, current thresholds for the quality of service attribute, etc., to a machine learning model configured to output a threshold value for the quality of service attribute. In some embodiments, the policy adjustment controller 210 updates the threshold value for a quality of service attribute based on an index or repository of threshold values for the quality of service attribute. In some embodiments, the policy adjustment controller 210 uses a combination of the machine learning model configured to output a threshold value and the index of threshold values to update the threshold for the quality of service attribute.

In an example embodiment, the policy adjustment controller 210 and/or computer-executable instructions stored on memory 201 of the policy adjustment system 200 are implemented using standard programming techniques. For example, the policy adjustment controller 210 and/or computer-executable instructions stored on memory 201 of the policy adjustment system 200 may be implemented as a "native" executable running on CPU 202, along with one or more static or dynamic libraries. In other embodiments, the policy adjustment controller 210 and/or computer-executable instructions stored on memory 201 of the policy adjustment system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/ module, and in different orders, and by different components/modules, yet still achieve the functions of the policy adjustment system 200.

In addition, programming interfaces to the data stored as part of the policy adjustment controller 210 can be available by standard mechanisms such as through C, C++, C#, Java, and Web APIs; libraries for accessing files, databases, or other data repositories; through scripting languages such as JavaScript and VBScript; or through Web servers, FTP servers, or other types of servers providing access to stored data. The policy adjustment controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of policy adjustment system 200, user equipment 101, SOM 103, CHF 105, PCF 107, UDM/UDR 109, and/or SMF 111.

Furthermore, in some embodiments, some or all of the components/portions of the policy adjustment controller 210, and/or functionality provided by the computer-executable instructions stored on memory 201 of the policy adjustment system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 3 is a table diagram representing a user policy data table 300, according to various embodiments described herein. The user policy data table 300 includes a device id column 310, a policy type column 311, a default policy column 312, a quality of service detail column 313, and a threshold limit column 314. The device id column 310 includes information used to identify a specific user equipment device, such as the user equipment 101. The policy type column 311 includes information identifying a policy assigned to a user equipment device. The default policy column 312 includes information specifying whether the policy assigned to the user equipment device is a default policy or a custom policy. The quality of service detail column 313 includes information indicating the quality of service attributes associated with the policy. The threshold limit column 314 includes information indicating threshold values for each quality of service attribute associated with the policy.

For example, rows 301 and 303 each indicate that the policy assigned to DeviceA and DeviceC are default policies, and have no customization. In contrast, row 302 indicates that DeviceB is not a default policy. In this example, DeviceA and DeviceB are both Bronze policies, DeviceB has a higher data rate than DeviceA, as illustrated in the quality of service detail column 313. Thus, DeviceB's quality of service attributes have been changed without changing DeviceA's quality of service attributes even though DeviceB and DeviceA are assigned the same policy.

Figure 4:
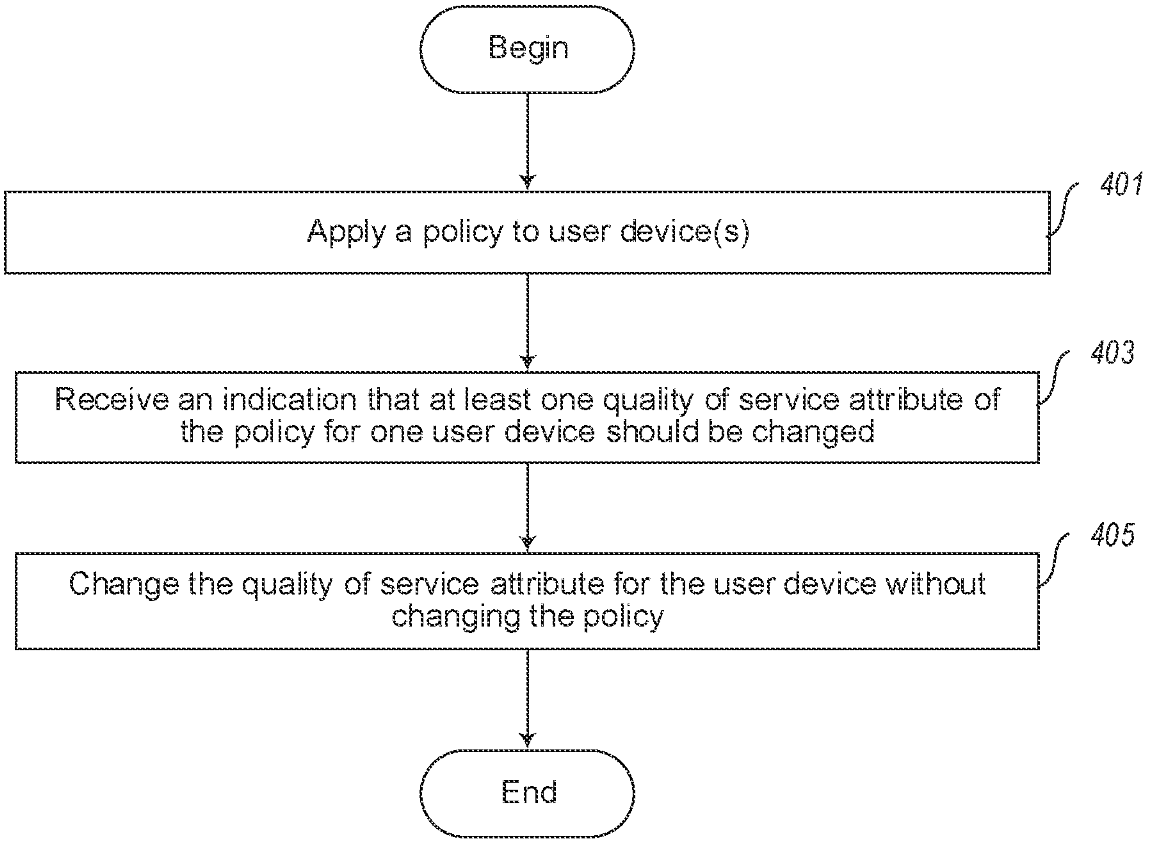
FIG. 4 is a flow diagram depicting a process for changing a quality of service attribute for a user equipment device, according to various embodiments described herein.

FIG. 4 is a flow diagram depicting a process for changing a quality of service attribute for a user equipment device, according to various embodiments described herein. At act 401, the policy adjustment system applies a policy to a plurality of user equipment devices.

At act 403, the policy adjustment system receives an indication that at least one quality of service attribute for one user device of the plurality of user equipment devices should be changed. In some embodiments, the indication that the at least one quality of service attribute should be changed is received from the user device. In some embodiments, the indication that the at least one quality of service attribute should be changed is received from a computing device other than the user device. The indication that the at least one quality of service attribute should be changed may be received before applying the policy to the one user device.

At act 405, the policy adjustment system changes the quality of service attribute for the user device without changing the policy. After act 405, the process ends. In some embodiments, acts 403 and 405 are performed by using a SOM. In some embodiments, acts 403 and 405 are performed by using an AF.

Figure 5:
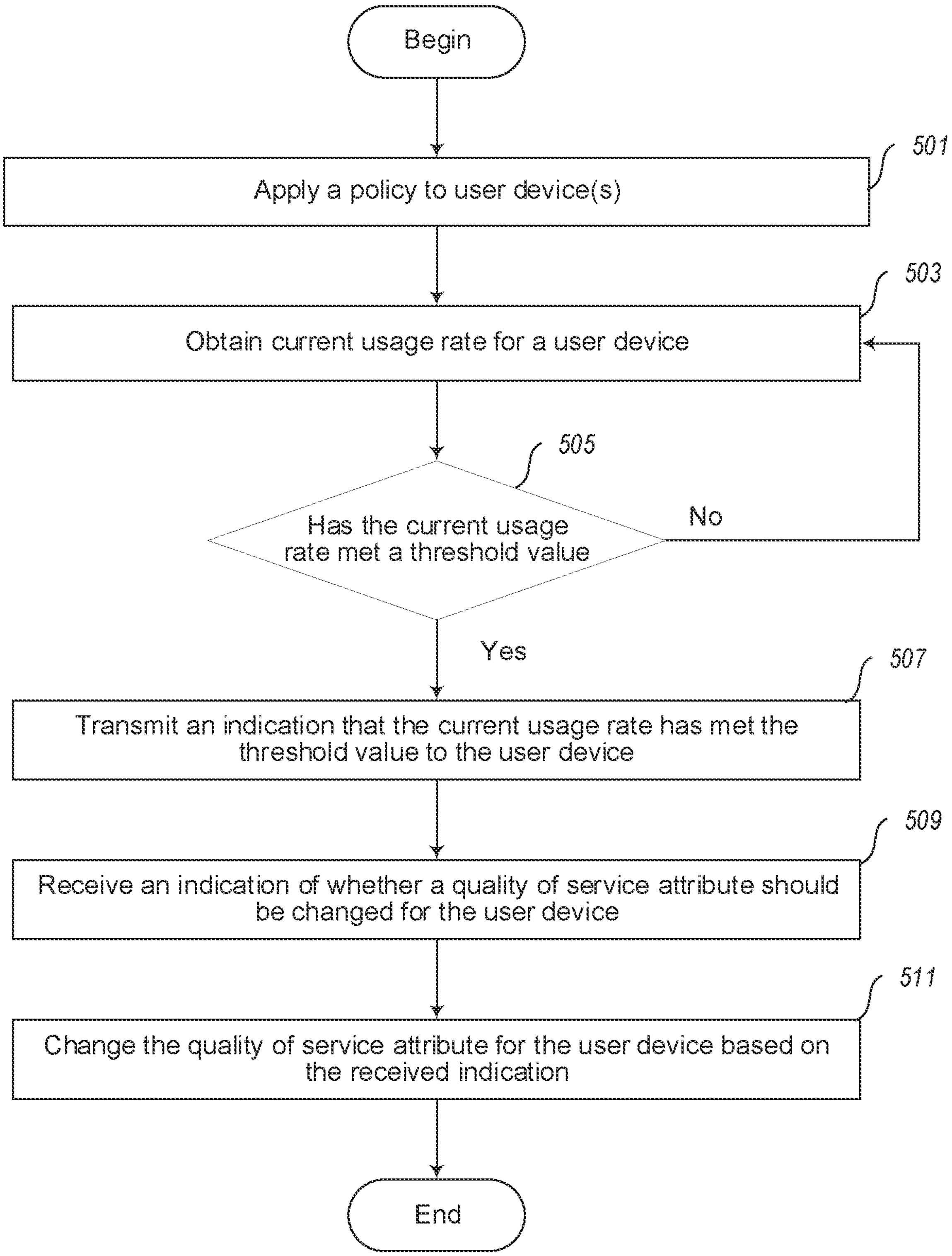
FIG. 5 is a flow diagram depicting a process for determining whether a quality of service attribute has exceeded a threshold value, according to various embodiments described herein.

FIG. 5 is a flow diagram depicting a process for determining whether a quality of service attribute has exceeded a threshold value, according to various embodiments described herein. At act 501, the policy adjustment system applies a policy to a plurality of user devices. At act 503, the policy adjustment system obtains a current usage rate for a device. At act 505, the policy adjustment system determines whether the current usage rate has met, or exceeded, a threshold value. If the current usage rate has not met, or exceeded, the threshold value, the process returns to act 503, otherwise the process continues to act 507.

At act 507, the policy adjustment system transmits an indication that the current usage rate has met the threshold value to the user device. In some embodiments, that the current usage rate has met the threshold value is transmitted to a computing device other than the user device.

At act 509, the policy adjustment system receives an indication of whether the quality of service attribute should be changed for the user device. In some embodiments, the indication of whether the quality of service attribute should be changed is received from the user device. In some embodiments, the indication of whether the quality of service attribute should be changed is obtained from a computing device other than the user device.

At act 511, the policy adjustment system determines whether the quality of service attribute should be changed based on the indication received from the user device, and changes the quality of service attribute for the user device based on a determination that the quality of service attribute should be changed. The policy adjustment system performs act 511 without altering the policy and quality of service attributes applied to the other user devices. After act 511, the process ends.

Figure 6:
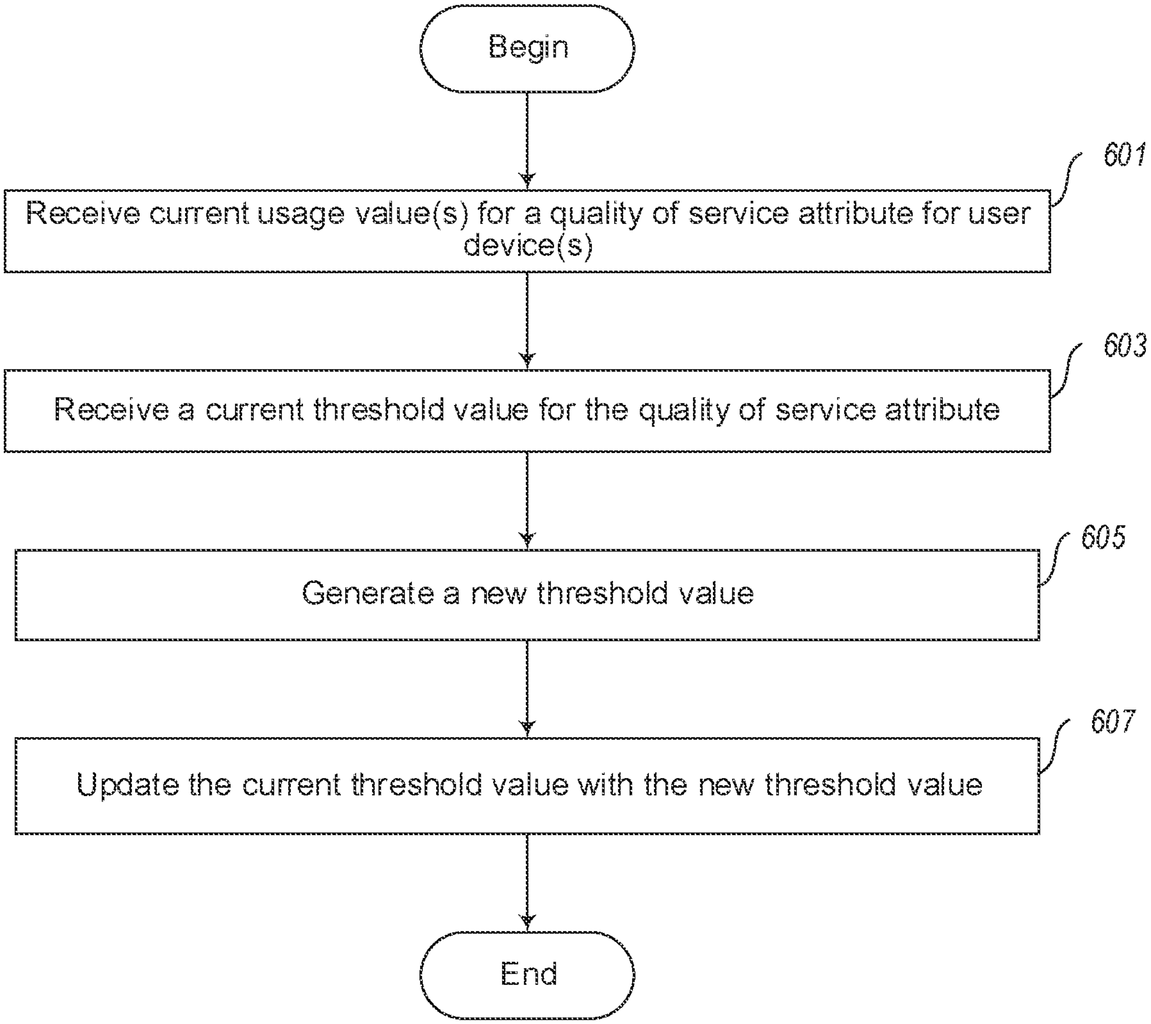
FIG. 6 is a flow diagram depicting a process for generating a new threshold value for a quality of service attribute, according to various embodiments described herein.

FIG. 6 is a flow diagram depicting a process for generating a new threshold value for a quality of service attribute, according to various embodiments described herein. At act 601, the policy adjustment system receives one or more current usage values for a quality service attribute for one or more user devices. At act 603, the policy adjustment system receives a current threshold value for the quality of service attribute. In some embodiments, the policy adjustment system receives the current threshold value from the CHF.

At act 605, the policy adjustment system generates a new threshold value. The policy adjustment system may use a machine learning model configured to output a new threshold value to generate the new threshold value. The policy adjustment system may perform statistical analysis on threshold values obtained from an index or repository of threshold values to generate a new threshold value. The policy adjustment system may generate the new threshold value via user input.

At act 607, the policy adjustment system updates the current threshold value with the new threshold value. After act 607, the process ends.

In some embodiments, the threshold value of the quality of service attribute is updated for a specified user device instead of for all user devices for which the policy is applied. In some embodiments the threshold value of the quality of service attribute is updated for all user devices for which the policy is applied. In some embodiments, the new threshold is generated based on current usage values for one device out of the plurality of devices.

Figure 7:
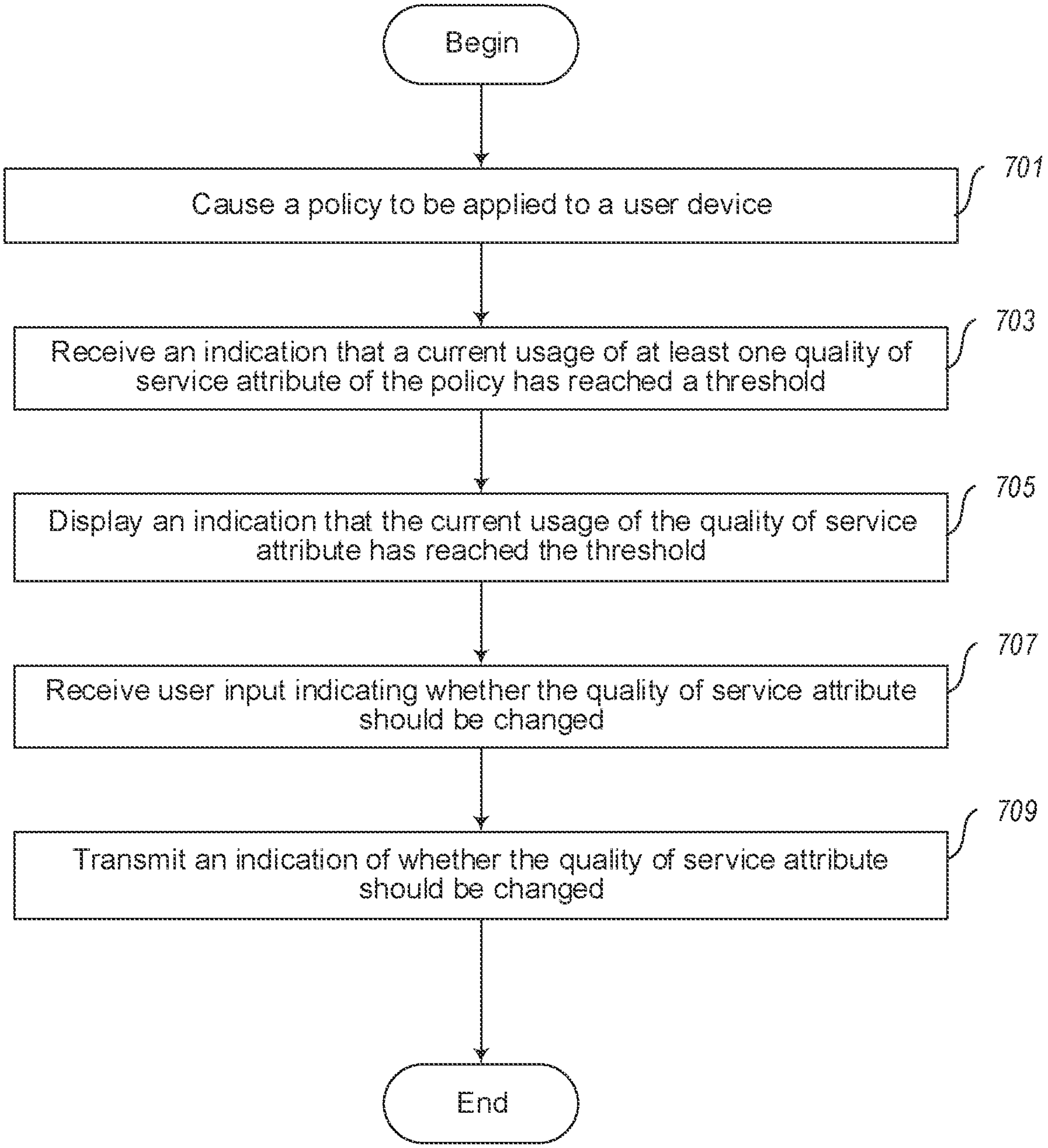
FIG. 7 is a flow diagram depicting a process to obtain an indication that a quality of service attribute should be changed, according to various embodiments described herein.

FIG. 7 is a flow diagram depicting a process to obtain an indication that a quality of service attribute should be changed, according to various embodiments described herein. At act 701, the policy adjustment system causes a policy to be applied to a user device. At act 703, the user device receives an indication that the user device's current usage of at least one quality of service attribute of the policy has reached or exceeded a threshold value. In some embodiments, the user device receives the indication that the current usage of at least one quality of service attribute has reached or exceeded a threshold value from a SOM. In some embodiments, the user device receives the indication that the current usage of at least one quality of service attribute has reached or exceeded a threshold value from an AF. At act 705, the user device displays an indication that the user device's current usage of the at least one quality of service attribute has reached or exceeded the threshold.

At act 707, the user device receives user input indicating that whether the at least one quality of service attribute should be changed. At act 709, the user device transmits an indication of whether the quality of service attribute should be changed to the policy adjustment system. In some embodiments, the user device transmits the indication of whether the quality of service attribute should be changed to a SOM. In some embodiments, the user device transmits the indication of whether the quality of service attribute should be changed to an AF. After act 709, the process ends.

Figure 8:
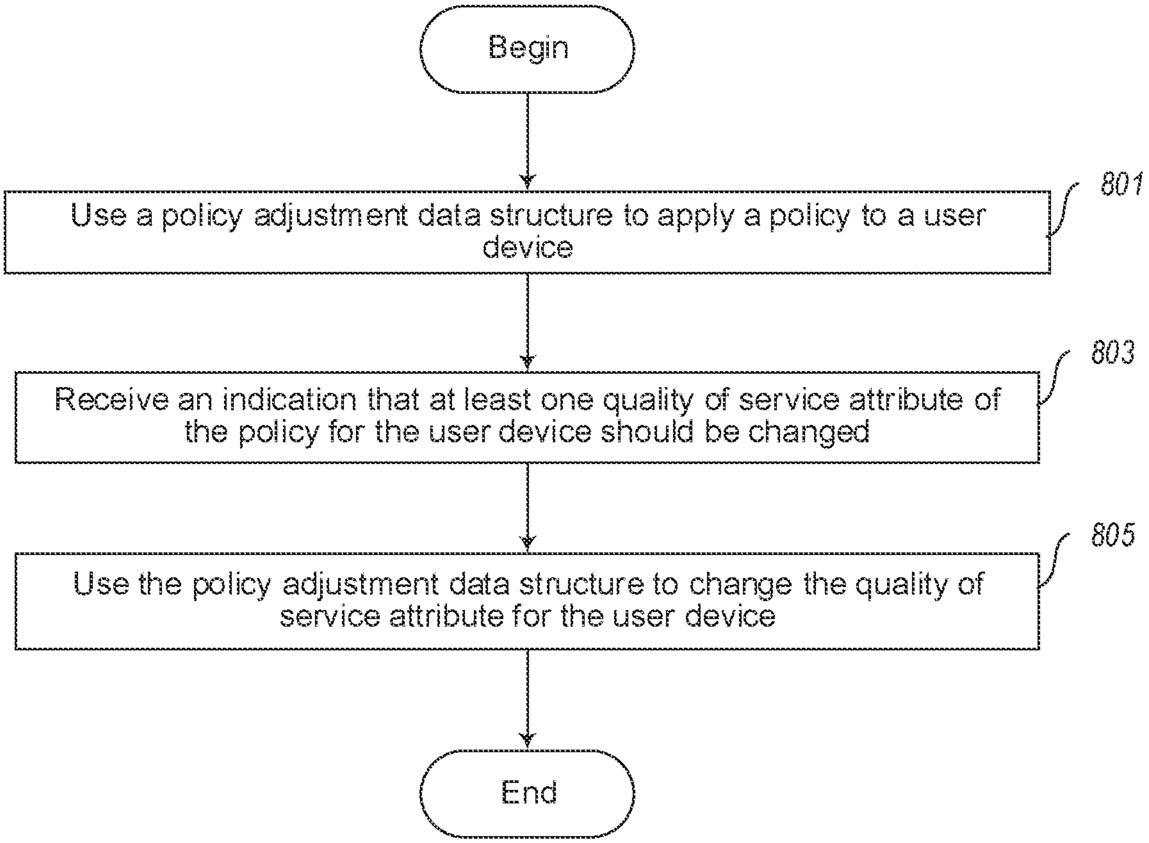
FIG. 8 is a flow diagram depicting a process to use a policy adjustment data structure to change a quality of service attribute for a user equipment device, according to various embodiments described herein.

FIG. 8 is a flow diagram depicting a process to use a policy adjustment data structure to change a quality of service attribute for a user equipment device, according to various embodiments described herein. At act 801, the policy adjustment system uses a policy adjustment data structure to apply a policy to a plurality of user devices. At act 803, the policy adjustment system receives an indication that at least one quality of service attribute of the policy applied to a user equipment device should be changed. At act 805, the policy adjustment system uses the policy adjustment data structure to change the quality of service attribute for the user equipment device.

In some embodiments, the policy adjustment data structure includes information specifying one or more policies. The policy adjustment data structure may include information specifying one or more quality of service attributes for each policy. The policy adjustment data structure may include information specifying one or more user devices. The policy adjustment data structure may include information specifying one or more thresholds for each quality of service attribute for each of the policies. The policy adjustment data structure may include information specifying one or more current values for at least one quality of service attribute for each user device. The policy adjustment data structure may include a machine learning model trained to output threshold values for at least one quality of service attribute based on at least current usage values for the at least one quality of service attribute. The policy adjustment data structures may include an index or repository of one or more alternative thresholds for at least one quality of service attribute.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:

at least one processor; and at least one memory coupled to the at least one processor, the memory having computer-executable instructions stored thereon that, when executed by the at least one processor, cause the system to perform:

electronically identifying a policy having one or more default quality of service attributes indicating a level of service provided to a user device by a network;

electronically applying the policy to a user device and a plurality of user devices;

electronically detecting that a current usage value for at least one quality of service attribute indicating the level of service provided to the user devices has exceeded a threshold value;

in response to detecting that the current usage value has exceeded the threshold value, electronically transmitting an indication that the current usage value has exceeded the threshold value to the user device;

electronically receiving, from the user device, an indication that the application of the policy to the user device is to change; and in response to receiving the indication, electronically changing the application of the policy to the user device via a network function, wherein changing the application of the policy to the user device comprises:

electronically indicating to the network that the application of the policy to the user device is different from the application of the policy to the plurality of other user devices, wherein the user device receives a different level of service related to one or more quality of service attributes and wherein the policy is still considered by the network to be applied to the user device with respect to other aspects of the policy.

2. The system of claim 1, wherein the computer-executable instructions further cause the system to perform:

electronically obtaining a current usage value of at least one quality of service attribute of the one or more default quality of service attributes for the user device; and electronically determining whether the current usage value of the at least one quality of service attribute has exceeded a predetermined threshold.

3. The system of claim 2, wherein the computer-executable instructions further cause the system to perform:

electronically transmitting, to the user device, an indication that the current usage value of the at least one quality of service attribute has exceeded the predetermined threshold based on a determination that the current usage value of the at least one quality of service attribute has exceeded the predetermined threshold.

4. The system of claim 3, wherein the computer-executable instructions further cause the system to perform:

electronically receiving, from the user device, the indication that at least one quality of service attribute of the one or more default quality of service attributes is to be changed for the user device.

5. The system of claim 2, wherein the computer-executable instructions further cause the system to perform:

electronically obtaining one or more current usage values of at least one quality of service attribute for a plurality of user devices;

electronically applying a machine learning model to the one or more current usage values, the machine learning model being trained to generate a new threshold based on one or more current usage values; and electronically updating the predetermined threshold with the new threshold.

6. The system of claim 2, wherein the computer-executable instructions further cause the system to perform:

electronically obtaining one or more current usage values of at least one quality of service attribute for a plurality of user devices;

electronically accessing an index of one or more threshold values for at least one quality of service attribute;

electronically determining a new threshold value for the at least one quality of service attribute based on the index of one or more threshold values; and electronically updating the predetermined threshold with the new threshold.

7. The system of claim 2, wherein determining whether the current usage value of the at least one quality of service attribute has exceeded a predetermined threshold is performed by a charging function.

8. A method in a user device, the method comprising:

causing a policy to be applied to the user device, the policy having one or more default quality of service attributes indicating a level of service provided to a user device by a network, and the policy being applied to a plurality of other user devices;

receiving an indication that a value of at least one quality of service attribute has reached a predetermined threshold;

displaying the indication that a value of the at least one quality of service attribute has reached a predetermined threshold to a user;

determining whether the at least one quality of service attribute should be changed based on user input; and based on a determination that the at least one quality of service attribute should be changed, causing a network function to change the level of service provided only to the user device by changing application of the policy to the user device without changing the level of service provided to the plurality of other user devices to which the policy is also applied and without changing a type of the policy applied to the user device by:

generating a new threshold value for the at least one quality of service attribute;

updating the predetermined threshold with the new threshold value; and indicating to the network that the application of the policy to the user device is different than the application of the policy to the plurality of other user devices.

9. The method of claim 8, wherein the indication that a value of the at least one quality of service attribute has reached a predetermined threshold is received from a SOM.

10. The method of claim 8, wherein an indication that the at least one quality of service attribute should be changed is transmitted to a SOM.

11. The method of claim 8, wherein the indication that a value of the at least one quality of service attribute has reached a predetermined threshold is received from an application function.

12. The method of claim 8, wherein an indication that the at least one quality of service attribute should be changed is transmitted to an application function.

13. One or more storage devices collectively storing a policy adjustment data structure for access and processing by a program executed by at least one computer processor associated with a network function that, when accessed and processed by the at least one computer processor, functionally enables the network function to:

identify a policy having one or more quality of service attributes indicating a level of service provided to a user device by a network;

apply the policy to a plurality of user devices; and change the application of the policy to a user device of the plurality of user devices by changing at least one quality of service attribute such that the level of service provided to the user device is changed and the level of service provided a plurality of other user devices is not changed and without changing a type of the policy applied to the user device, the policy adjustment data structure comprising:

information specifying one or more policies;

for each respective user device of the one or more user devices:

information specifying whether a default version of a policy of the one or more policies or a customized version of the one or more policies is applied to the respective user device; and information specifying a policy of the one or more policies that is applied to the respective user device; and for each respective policy of the one or more policies:

information specifying one or more quality of service attributes, wherein the information specifying user devices and the information specifying one or more policies are used to apply the policy to the user device, wherein the information specifying user devices and information specifying policies are used to determine whether a current usage of an aspect of the network by the user device has exceeded a threshold value, and wherein the level of service provided to the user device with respect to one or more quality of service attributes of the policy is different from the level of service provided to other user devices to which the policy is applied based on the information specifying whether the default version of the policy or a customized version of the policy is applied to the user device and in response to receiving input from the user device indicating that the level of service provided to the user device is to be changed after a current usage of the level of service with respect to the one or more quality of service attributes by the user device has exceeded a threshold value, and wherein the network function generates a new threshold value for the one or more quality of service attributes, and the threshold value is updated based on the new threshold value.

14. The one or more storage devices of claim 13, wherein the data structure further comprises:

for each respective policy of the one or more policies:

information specifying one or more thresholds for each of the one or more quality of service attributes; and for each respective user device of the one or more user devices:

information specifying one or more current values for at least one quality of service attribute of the policy applied to the respective user device, wherein the information specifying one or more thresholds and the information specifying one or more current values is used to determine whether at least one current value of the one or more current values has exceeded at least one threshold of the one or more thresholds, and wherein the at least one computer processor is able to transmit an indication to the user device that the at least one current value has exceed the at least one threshold.

15. The one or more storage devices of claim 14, wherein the data structure further comprises:

a machine learning model trained to generate one or more new thresholds based on one or more the current values, wherein the one or more current values for at least one respective user device of the one or more user devices are used to apply to the machine learning model to generate the one or more new thresholds, and wherein the one or more new thresholds replace at least one of the one or more thresholds associated with at least one policy.

16. The one or more storage devices of claim 14, wherein computer-executable instructions further cause a system to:

an index of one or more alternative thresholds for at least one quality of service attribute of the one or more quality of service attributes, wherein the index of one or more alternative thresholds is used to replace at least on threshold of the one or more thresholds associated with at least one policy.

* * * * *